March 7, 1939.  E. A. WALES  2,149,324
FRICTION ELEMENT
Filed July 26, 1937

Inventor:
Earl A. Wales
By Lee J. Gary
Attorney

Patented Mar. 7, 1939

2,149,324

UNITED STATES PATENT OFFICE 2,149,324

FRICTION ELEMENT

Earl A. Wales, Cleveland, Ohio, assignor to Raybestos-Manhattan, Inc., Bridgeport, Conn., a corporation of New Jersey Application July 26, 1937, Serial No. 155,603

6 Claims. (Cl. 192—107)

This invention relates to improvements in friction elements and particularly to a friction ring primarily adapted to be used as a clutch facing for automotive use, wherein the body of the clutch facing is formed of non-woven material, and has superposed on portions of its surface woven fabric wearing surfaces.

The object of this invention is to form friction elements suitable for clutch facings which are highly adaptable for use in various clutch constructions or assemblies, such as one or two clutch plate constructions or multiple clutch plate constructions, and are adapted to meet the modern critical and complex clutch requirements.

In order to produce a friction element adaptable to such uses I have devised a construction which combines the use of a fiber clutch disk having some of the features shown in the United States patent to M. F. Judd No. 1,536,588 wherein the use of a fiber clutch disk is shown and teeth are generated or formed on the inner or outer periphery of the ring, together with some of the features shown by United States Patent No. 1,941,872 to Hamilton Abert, wherein a nonwoven backing is combined with a woven wearing surface.

In my construction I may use a friction ring made up of asbestos or other pulp wherein the fibers may be first formed in the form of millboard or the fibers may be molded in the form of the element. In forming millboard asbestos fibers in the form of pulp are built up in successive layers on the roll of a paper making machine until the desired thickness is obtained and the resultant sheet later stripped from the machine. After the resultant sheet of felted fibers is dried, friction rings somewhat larger than the dimensions of the finished element are die-cut therefrom and impregnated with any of the conventional and well known heat hardenable binders such as air oxidizable or polymerizable binder. When the element is formed of molded pulp the fibers may be used dry and mixed with dry, semi-liquid or liquid binder, in the mold, or the mixture may be first beaten and formed into a doughy mass and placed in the molds.

Either one of these methods of felting the fibers may be used to produce certain variable and desirable characteristics of the finished product, and so also to the same end various well known heat hardening impregnating binders may be used. Thus in some instances it may be more desirable to have the fibers pre-felted in the form of millboard and later saturated with the binder, and in other instances it may be more desirable to form a moulding mix wherein the fibers and the binders are intermingled. Also certain elements of economy may be considered, as for example, in the instance of millboard, considerable waste is encountered, as the fibers are first formed in a sheet and considerable waste results in the cutting thereof.

After impregnation the binder-impregnated fibers may be "press-cured" under heat and pressure in a mold so as to compact the materials and enable them to be handled and to give them body and coherence, although the pressure and heat are not sufficient to harden the binder or to press it into final size or shape.

Preferably at this stage, there is superposed on the surfaces of the partly formed friction element a partial facing of woven friction material, it being understood that "woven" may include braided or interlaced strands of fibrous material, preferably asbestos fibers, and which may include woven material having metallic reinforcements therein. This woven partial facing has a radial width appreciably less than that of the fibrous ring, and is superposed on the surfaces thereof so that it extends from either the outer or the inner periphery thereof to a point spaced from the inner or outer periphery respectively. This woven material may be formed in various manners, as for example, annular rings may be directly cut out of a sheet of material to required size, or this may be formed from strips of material. When formed of strips it will of course be necessary to impart a shaping step thereto as for example, by "coning" as set forth in the above mentioned patent to Abert. Other forms of woven material may be used, as for example, that of the "Chevron" type wherein a strip of woven material is longitudinally folded and bent over and wound in the form of approximate ring size in a manner so that successive convolutions nest within each other, or a shingle type fabric may be used wherein short lengths of material are laid in overlapping end engagement. These woven materials may or may not be previously impregnated with binders or frictioning materials, and like the fibrous element they may also previously have been partially treated and compressed to enable them to be more easily handled.

The woven ring may be bonded to the fibrous ring by various methods. For example, the woven ring may be placed directly upon the fibrous ring and impressed thereon and amalgamated therewith directly in the mold. Another method may provide for an annular depression to be formed in the fibrous ring in the press-curing operation by means of the mold so that the woven ring may be placed in the formed recess, or an annular recess may be cut into the fiber ring by any conventional method and the woven ring placed in the recess or depression so formed.

The combined rings are then subjected to heat and pressure in a final molding and curing operation to reduce and compact the rings to the required size and bond them together and to harden the binder and to form a firm bond between the two rings. This results in a hard, dense structured friction element, the working surfaces of which are divided into two concentric areas, having different coefficients of friction and retaining desirable features of two different types of friction elements, namely, those of fibrous construction and those of woven construction.

The disk formed in this manner may have generated on either its outer or inner periphery, teeth which may be used to engage splines or keys, or used for gear purposes. These teeth may be formed during the molding operation or they may be cut after completion of the rings, the teeth being formed on the peripheral portions on which woven material has not been bonded so that they will have a clean and sharp structure and will wear evenly during use.

Other objects and advantages of my invention will be apparent upon consideration of the following description and drawing, wherein.

Figure 1:
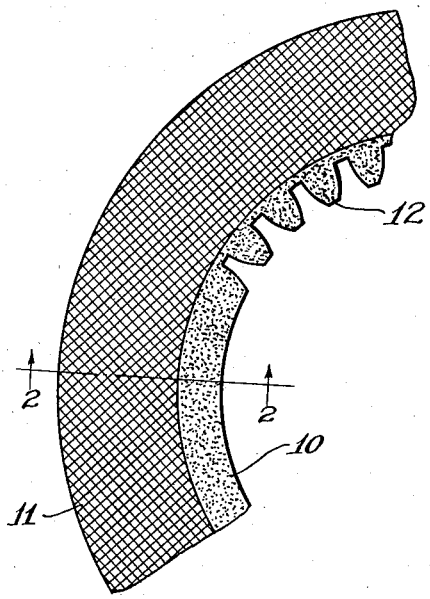
Fig. 1 is a face view of a portion of a clutch ring embodying my invention.
Figure 3:
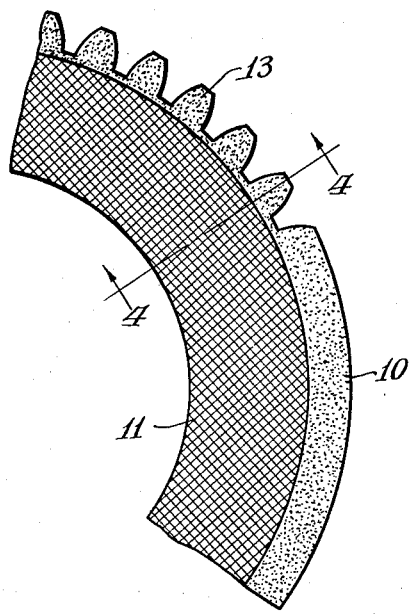
Fig. 3 is a face view of a portion of a clutch ring embodying my invention showing a different positioning of the woven ring and generated teeth from that of Fig. 1.
Figure 2:
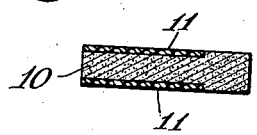
Fig. 2 is a section thereof taken on the line 2—2 of Fig. 1.
Figure 4:
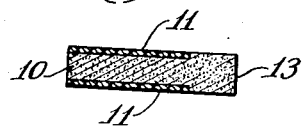
Fig. 4 is a section on the line 4—4 of Fig. 3.

Referring to the drawing, Fig. 1 shows a section of a completed ring having a portion 10 formed of fibrous material formed of felted fibers which have been either previously molded or formed as millboard in the manner above set forth. The cloth inserts on the faces of the friction ring are indicated at 11, and as previously stated may be of woven, braided or other cloth-like material. This cloth may be of a single layer or may have varying thicknesses so that each surface may have several plies of material thereon or the material may have been formed in layers, as for example, in the use of "Chevron" type material or a shingle structure. As will be noted, the fibrous material extends from either the outer periphery to a point spaced from the inner periphery as shown in Fig. 1, or as shown in Fig. 3 it may extend from the inner periphery to a point spaced from the outer periphery so as to form two concentric areas, one having a facing of the woven cloth and the other comprising the fibrous structure of the body. The friction elements may be used in such form for clutch elements in automotive use or other industrial use, or may be used as brakes in certain types of machinery. If desired, the teeth 12 may be formed on the inner periphery of the friction ring, the depth of the teeth extending only into the portion thereof not faced with the woven material, and likewise, as shown in Fig. 3, teeth 13 may be generated from the other periphery of the friction ring, their length not exceeding the radial thickness of the fibrous ring at its un-cloth-covered face portion, so that the woven material does not extend beyond the roots of the teeth.

While the drawing shows segments of clutch facings having for the purpose of illustration, teeth formed on portions only of the peripheries, it will be understood that when teeth are used they are generated on the complete inner or outer peripheries, or the facing may be formed and used without teeth, the structure remaining the same.

It will therefore be seen that the friction element which I have shown and described may be formed in various ways and of various materials, and I therefore wish it to be broadly construed as being a friction element in the form of an annular ring formed of non-woven fibers having superposed on the working surfaces thereof woven material in the form of a ring of lesser width than the fibrous ring so as to form two concentric areas of varying facial characteristics. It is therefore obvious that the various changes in the details and arrangement of parts may be made as herein shown and described, and I therefore do not wish to be restricted thereto except as so limited by the appended claims.

I claim as my invention:

1. An annular friction element comprising a body of fibrous structure and a hardened binder, and having superposed on a surface thereof and embedded therein in the form of an annular ring woven asbestos cloth, said cloth extending over the said surface from one periphery thereof to a point spaced from its other periphery.

2. An annular friction element having integral splines of clean sharp and homogenous structure and comprising felted fibers and a hardened binder, and having a restricted portion of its surface area covered by a concentric ring comprising woven asbestos cloth the thickness of the ring at said covered area being equal to the thickness of the area on which the splines are generated.

3. An annular friction element having integral teeth of clean and sharp structure and adapted to wear evenly and comprising felted fibers and a hardened binder, and having an annular recess filled with a body comprising woven asbestos cloth and a binder.

4. An annular friction element having integral teeth of homogenous structure and comprising felted fibers and a hardened binder, and having an annular surface recess filled with a body comprising woven asbestos cloth and a binder, the roots of said teeth extending to a point adjacent said filled recess.

5. An annular friction element having integral teeth formed on one of its concentric defining edges and comprising felted fibers and a hardened binder, the surface areas thereof extending to the roots of said teeth only comprising an annular body of woven asbestos cloth amalgamated therewith and impressed thereon.

6. An annular friction element comprising a body formed of felted fibers and a heat hardened binder, and having embedded therein in annular form woven asbestos cloth, said cloth extending to one periphery of said ring, and peripheral gear teeth formed on the opposite peripheral portion of said ring, the roots thereof extending to a point adjacent said cloth embedded area.

EARL A. WALES.